United States Patent [19]

Gukkenberger et al.

[11] Patent Number: 4,854,035
[45] Date of Patent: Aug. 8, 1989

[54] METHOD OF MANUFACTURING A MAGNETIC HEAD

[75] Inventors: Horst Gukkenberger, Zirndorf; Karl Eberle, Cadolzburg, both of Fed. Rep. of Germany

[73] Assignee: U.S. Philips Corporation, New York, N.Y.

[21] Appl. No.: 81,213

[22] Filed: Jun. 29, 1987

[30] Foreign Application Priority Data

Jun. 30, 1986 [DE] Fed. Rep. of Germany ....... 3621873

[51] Int. Cl.[4] .............................................. G11B 5/127
[52] U.S. Cl. ...................................... 29/603; 360/119;
360/120; 360/126; 228/190; 29/609
[58] Field of Search ................... 29/603, 609; 360/119, 360/120, 125–127; 156/153; 272.8; 228/190

[56] References Cited

U.S. PATENT DOCUMENTS

| 3,049,790 | 8/1962 | Camras | 29/603 |
| 3,454,728 | 7/1969 | Siegemund | 29/603 |
| 4,544,974 | 10/1985 | West, Jr. et al. | 29/603 X |
| 4,665,612 | 5/1987 | Damen et al. | 29/603 |

FOREIGN PATENT DOCUMENTS 0128586 12/1984 European Pat. Off. .

Primary Examiner—Michael W. Ball
Assistant Examiner—Jeff H. Aftergut
Attorney, Agent, or Firm—F. Brice Faller

[57] ABSTRACT

Two soft magnetic core halves of amorphous metal are connected together via a non-magnetic gap and the core halves are supported bilaterally by two core supports. The core supports have a connection member at the gap area and at the short-circuit area of the head block thus constructed on both sides of the head gap. The parts of the head are welded by means of the connection members to form a mechanically stable unit.

4 Claims, 1 Drawing Sheet

METHOD OF MANUFACTURING A MAGNETIC HEAD

BACKGROUND OF THE INVENTION

The invention relates to a method of manufacturing a magnetic head in which two soft magnetic core halves of amorphous metal are connected together via a non-magnetic gap. The core halves which are bilaterally supported by two core supports, are combined to a head block. The core supports have a connection member at the gap area and at the short-circuit area, whilst coil turns are wound around at least one core half and in which furthermore a head block is split up into two connected half blocks.

In consumer electronics video magnetic tape recorders magnetic heads having small trackwidths and extremely small gap lengths are used in large piece numbers. This results in the volume of such a head being very small. The main problem of manufacturing such a small magnetic head in large series is that the annular core provided with a gap is to be given a sufficient mechanical stability and that the magnetic head is to have a wear resistant long lifetime.

Methods of manufacturing a magnetic head with a small trackwidth are known whose mechanical stability is achieved by a supporting member provided unilaterally or bilaterally on the annular core. The parts are joined by means of bonding layers of low-melting point glass or of silicon resin.

A drawback of this method is that due to the small bonding faces and due to the partly insufficient bonding of the materials the stability of the connection between the annular core (core halves) and the supporting members supporting these halves is inadequate.

SUMMARY OF THE INVENTION

A magnetic head having amorphous metallic core halves with a small trackwidth and an extremely small gap length is provided. All head parts (core halves and core support) are mechanically connected together in a stable manner by means of a sealed connection of the separate parts and the stable connection is suitable for a method of manufacturing magnetic heads in large piece numbers, which can be carried out automatically.

DETAILED DESCRIPTION OF THE PREFERRED EMBODIMENT

Figure 1:
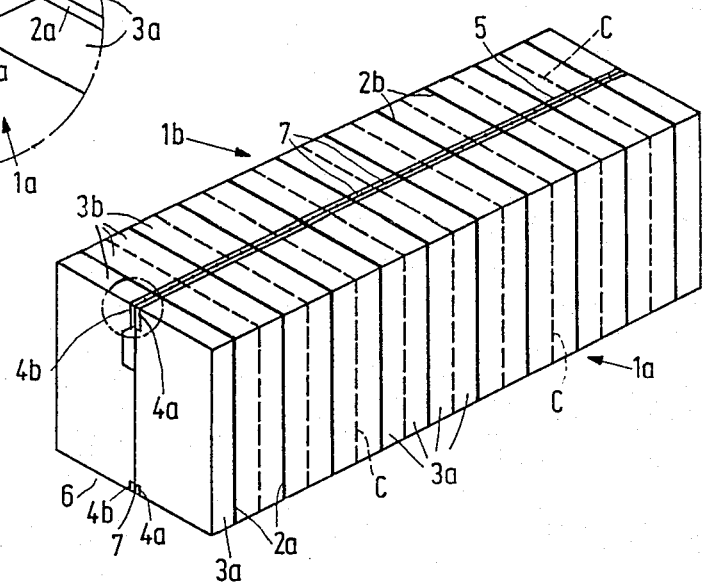
FIG. 1 is a perspective view of two half blocks connected together for the manufacture of a single head block.

FIG. 1 shows the way in which two connected half blocks 1a, 1b are formed. Firstly each block half is laminated, that is to say, an amorphous metal foil is each time provided as a core half 2a, 2b between each two core supports 3a, 3b. The core supports 3a and 3b are each provided with connection members 4a, 4b both at the gap area 5 and at the short-circuit area 6. When stacking the single components 2a, 3a in block 1a and 2b, 3b in block 1b it is additionally possible to provide them with a glass interface in advance which, by the effect of pressure and temperature, additionally hardens the half block. In any case, however, the connection members 4a and 4b, which are preferably a low melting point glass, connect the components in an adequate manner. According to a further step the surfaces of each half block provided as gap faces are ground, lapped and polished to an optimum surface smoothness. Each second half block 1b is provided with a channel as a free space for the coil turns. Subsequently the non-magnetic gap material 12 is provided in known manner, for example by vapour deposition. The processed surfaces of the two half blocks 1a, 1b are then pressed together in a device and the half blocks are welded together both at the gap area 5 and at the short-circuit area 6 by means of a laser weld 7 at each area of a single head block to be separated at a later stage. The overall block which is thus bonded mechanically is finally separated by means of sawing along the indicated lines c into single head blocks 8 (FIG. 3).

Figure 2:
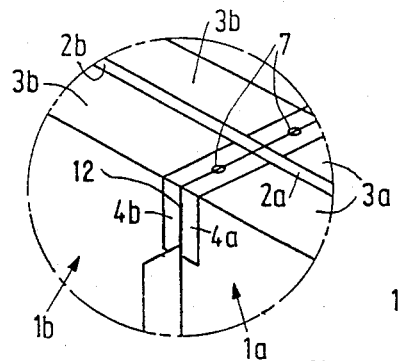
FIG. 2 is a detail of FIG. 1 shown on a larger scale.

FIG. 2 shows a detail of FIG. 1 on a larger scale, namely a laser weld spot 7 at the gap area between the two half blocks 1a and 1b. Two weld spots 7 are formed in the front surfaces for each gap, one on either side thereof as shown.

Figure 3:
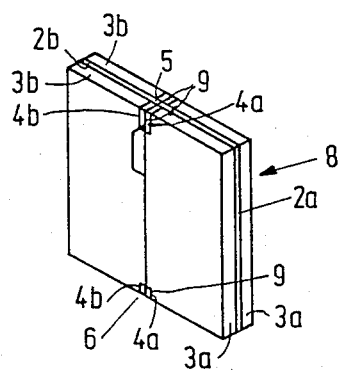
FIG. 3 is a perspective view of an unprocessed head block split up into two connected half blocks.
Figure 4:
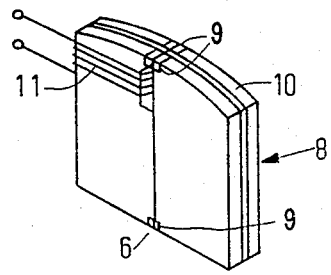
FIG. 4 is similar to FIG. 3, but with a processed tape contact face and the oppositely located short-circuit area.

FIG. 3 shows a single head block 8 separated from the overall block, whose parts are connected together by means of laser weld 9 on the two surface sides at the gap area 5 and at the short-circuit area 6 via the connection members 4a and 4b. The separate parts of the block 8 are now mechanically bonded in such a rigid manner that it is possible, by means of processing the face on the side of the gap area and the short-circuit area, to substantially remove the welding spots provided on the overall block. The tape contact face 10 is simultaneously given the ultimate arched form. The parts on the separate head block 8 are again bonded at the areas where critical heating of the amorphous metal 2a, 2b is avoided. Due to the removal of the frontal faces in the gap and short-circuit areas it is achieved, in addition to the formation of the tape contact face with the desired gap height, that the welding-affected areas on the overall block in the amorphous metal of the core halves are removed. Finally the single head block 8 is provided with coil turns 11 as shown in FIG. 4.

What is claimed is:

1. A method of manufacturing a magnetic head comprising the following steps laminating together core supports with core halves of amorphous metal therebetween to form first and second laminated half blocks, each half block having a gap face and opposed front and rear surfaces, said gap face having a gap area at said front surface and a short circuit area at said rear surface, providing each core support with a connection member in the gap face at the gap area and a connection member in the gap face at the short circuit area of each laminated half block, said connection members extending between core halves, providing at least one of the gap faces with a non-magnetic gap material, pressing together the gap faces of the half blocks with the core halves aligned in pairs and defining a non-magnetic gap between the core halves of each pair, welding together the half blocks by forming welding spots between adjacent connection members on the front and rear surfaces of respective half blocks, two welding spots being formed in the front surfaces for each gap, one on each side thereof, separating an individual head by dividing the core supports between core halves, each head having a pair of opposed side faces, one on each side of said gap, welding the connection members on each side face, removing the welding spots formed on the front surfaces.

2. The method of claim 1 wherein at least some of the welding is carried out by laser.

3. The method of claim 1 wherein at least some of the welding is carried out by electron beam.

4. The method of claim 1 wherein the gap face of one of said laminated half blocks is provided with a coil winding channel prior to pressing said gap faces together.

* * * * *